(12) United States Patent
Lin (10) Patent No.: US 10,346,661 B2
(45) Date of Patent: Jul. 9, 2019

(54) METHOD AND SYSTEM FOR GENERATING TWO DIMENSIONAL BARCODE INCLUDING HIDDEN DATA

(71) Applicant: Yuan Ze University, Taoyuan (TW)

(72) Inventor: Pei-Yu Lin, Taoyuan (TW)

(73) Assignee: Yuan Ze University, Zhongli (TW)

( * ) Notice: Subject to any disclaimer, the term of this patent is extended or adjusted under 35 U.S.C. 154(b) by 0 days.

(21) Appl. No.: 15/822,889

(22) Filed: Nov. 27, 2017

(65) Prior Publication Data

US 2019/0102588 A1   Apr. 4, 2019

(30) Foreign Application Priority Data

Sep. 30, 2017   (TW) .............................. 106133949 A (51) Int. Cl.
*G06K 7/14*   (2006.01)

(52) U.S. Cl.
CPC ......... *G06K 7/1417* (2013.01); *G06K 7/1434* (2013.01); *G06K 7/1473* (2013.01)

(58) Field of Classification Search
CPC ... G06K 7/1417; G06K 7/1434; G06K 7/1473

USPC ..................................... 235/462.09
See application file for complete search history.

(56) References Cited

U.S. PATENT DOCUMENTS

| 9,984,366 B1* | 5/2018 | Jammikunta ...... G06Q 20/3274 |
| 2013/0015236 A1* | 1/2013 | Porter .................. G06F 21/645 |
| | | 235/375 |

* cited by examiner

*Primary Examiner* — Toan C Ly
(74) *Attorney, Agent, or Firm* — Wang Law Firm, Inc.

(57) ABSTRACT

Provided herein is a method for generating a two dimensional barcode including hidden data, including steps of: acquiring a first two dimensional barcode and extracting a plurality of first data modules from the first two dimensional barcode, wherein the first data modules represent an original message data, and acquiring the hidden data and processing the first data modules to embed the hidden data in the first data modules to generate a plurality of second data modules and performing an error correction code encoding on the second data modules to adjust the second data modules and generate a plurality of error correction code modules and merging the adjusted second data modules and the error correction code modules to generate a second two dimensional barcode.

9 Claims, 9 Drawing Sheets
(5 of 9 Drawing Sheet(s) Filed in Color)

METHOD AND SYSTEM FOR GENERATING TWO DIMENSIONAL BARCODE INCLUDING HIDDEN DATA

CROSS-REFERENCE TO RELATED APPLICATION

This application claims priority from Taiwan Patent Application No. 106133949, filed on Sep. 30, 2017 at the Taiwan Intellectual Property Office, the content of which is hereby incorporated by reference in its entirety for all purposes.

BACKGROUND OF THE INVENTION

1. Field of the Invention

The present invention relates to a method and a system for generating a two dimensional barcode, and especially relates to a method and a system for generating a two dimensional barcode including hidden data.

2. Description of the Related Art

Based on the fundamentals of a one dimensional barcode, a two dimensional barcode extends one more dimension to contain more readable codes and uses black and white rectangular patterns to represent binary data. A two dimensional barcode may include information, which can be extracted after the barcode being scanned. Two dimensional barcodes have position detection patterns and error correction capability which one dimensional barcodes do not possess. Due to error correction capability, the information in the barcode can be correctly restored even if the barcode is not fully recognized or is damaged or defected. There are many varying types of two dimensional barcodes, and a QR code (Quick Response Code) is a popular one.

Some data, which is not intended to be accessed by others or to be interpreted directly, can be hidden in documents or images and sent to specific persons. Because a two dimensional barcode is fundamentally a coded image, therefore, the hidden data can be secretly embedded in a two dimensional barcode. A commonly known approach to hide data in a two dimensional barcode is to pick several modules from the two dimensional barcode and to replace these modules by the hidden data, but if the modified two dimensional barcode is damaged, the scan device may not able to extract original message data from the two dimensional barcode for acquiring the hidden data. This approach of hiding data in a two dimensional barcode lowers the error correction capability of the two dimensional barcode.

SUMMARY OF THE INVENTION

An embodiment of the present invention provides a method for generating a two dimensional barcode including hidden data, including steps of: acquiring a first two dimensional barcode and extracting a plurality of first data modules from the first two dimensional barcode, wherein the first data modules represent original message data, acquiring hidden data and processing the first data modules to embed the hidden data in the first data modules to generate a plurality of second data modules and performing an error correction code encoding on the second data modules to adjust the second data modules and generate a plurality of error correction code modules and merging the adjusted second data modules and the error correction code modules to generate a second two dimensional barcode.

An embodiment of the present invention provides a system for generating a two dimensional barcode including hidden data, including: an acquisition unit configured to acquire a first two dimensional barcode and extracting a plurality of first data hiding units from the first two dimensional barcode, wherein the first data modules represent an original message data, a data hiding unit configured to acquire the hidden data and process the first data modules to embed the hidden data in the first data modules to generate a plurality of second data modules, a encoding unit configured to perform an error correction code encoding on the second data modules to adjust the second data modules and generate a plurality of error correction code modules, and a merge unit configured to merge the adjusted second modules and the error correction code modules to generate a second two dimensional barcode.

In comparison with the current technology, the system for generating a two dimensional barcode including hidden data in the embodiments of the present invention provide following advantages:

1. the two dimensional barcode including the hidden data can be posted on a product requiring an authenticity check; and
2. the error correction capability of the two dimensional barcode including the hidden data is the same as the error correction capability of the original two dimensional barcode.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF THE PREFERRED EMBODIMENTS

The invention will be described more completely hereinafter with reference to the accompanying drawings, in which exemplary embodiments of the invention are illustrated. It is understood by those skilled in the art that the embodiments described may be modified in various different ways without departing from the spirit or the scope of the present invention.

In order to clearly describe the present invention, the irrelevance is omitted, and like reference numerals in the entire specification represent similar elements. In addition, in order to facilitate explanation, the dimensions and thicknesses of individual structural components shown in the drawings are arbitrarily illustrated, and the present invention is not limited to the drawings.

The purpose of the present invention is providing a method and a system for generating a two dimensional barcode including hidden data, wherein the two dimensional barcode can be a QR code, but the two dimensional barcode in the present invention is not limited to any specific types. The two dimensional barcode including the hidden data can be posted on a product that requires authenticity checks, but the usage of the present invention is not limited.

Furthermore, the main idea of the method and the system for generating the two dimensional barcode including the hidden data in the embodiments of the present invention is embedding the hidden data in a plurality of original data modules of the original two dimensional barcode to generate data modules including the hidden data. Next, error correction code modules that correspond to the data modules including the hidden data are calculated, and the error correction code modules and the data modules including the hidden data are merged to generate a two dimensional barcode including the hidden data. Because the error correction code modules are calculated based on the data modules including the hidden data, the two dimensional barcode including the hidden data has the same error correction capability as the original two dimensional barcode has.

Figure 1:
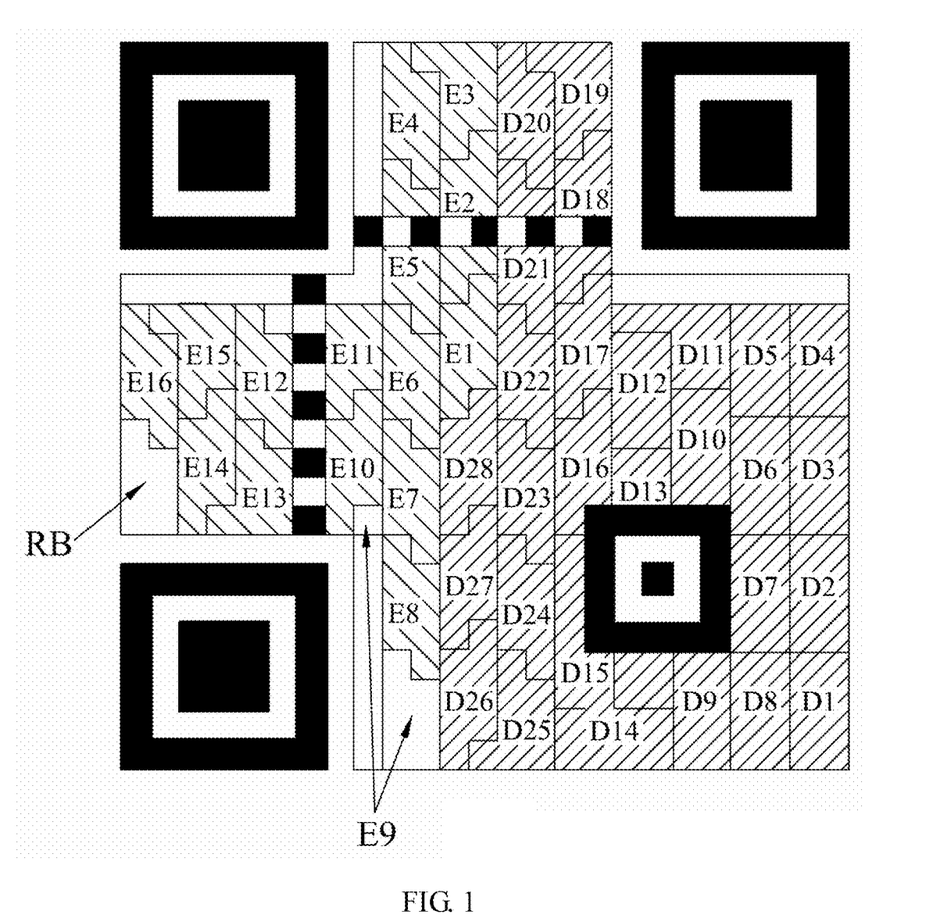
FIG. 1 is a schematic diagram showing a structure of a QR code.

The following refers to FIG. 1, which is a schematic diagram showing a structure of a QR code. For example, the two dimensional barcodes in the embodiments of the present invention can be a QR code, such as shown in FIG. 1, but not in limited to. The QR code in FIG. 1 follows the standard of ISO 18004 version 2, which includes a functional block, data blocks D1 to D28, error correction blocks E1-E16, and a remainder bit block RB. The functional block includes four nested-square patterns, three white separating patterns around three nested-square patterns, and an alternating black and white timing pattern.

Each one of data blocks D1-D28 has a plurality of data modules, each one of which is either white or black to represent a bit of message data. The error correction blocks E1-E16 include a plurality of error correction modules, each one of which is either white or black to represent a bit of an error correction code, wherein the error correction code is calculated based on message data, which means error correction blocks E1-E168 is generated based on data blocks D1-D28.

Figure 2:
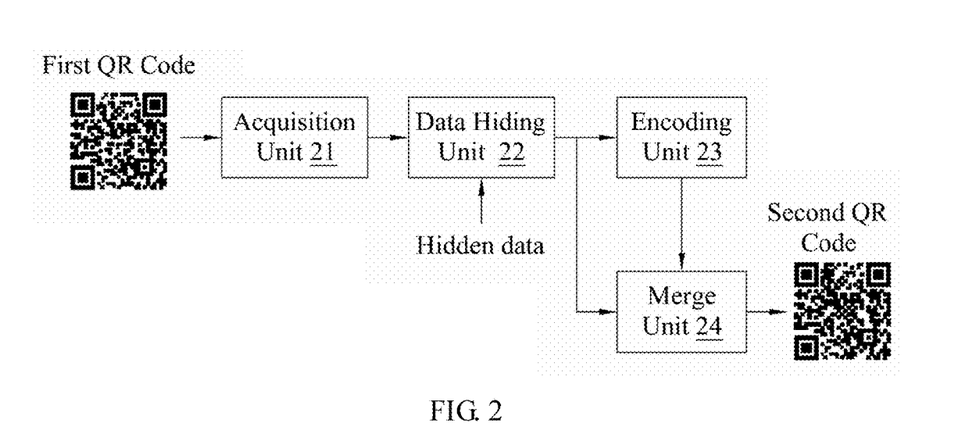
FIG. 2 is a block diagram showing a system for generating a two dimensional barcode including hidden data in an embodiment of the present invention.

The following refers to FIG. 2, which is block diagram showing a system for generating a two dimensional barcode including hidden data in an embodiment of the present invention. The system 2 for generating the two dimensional barcode can be embodied by a hardware circuit or by a computer device accompanied by software algorithms, but the present invention is not limited to it. The system 2 for generating the two dimensional barcode including the hidden data includes an acquisition unit 21, a data hiding unit 22, an encoding unit 23, and a merge unit 24, wherein the acquisition unit 21 electrically connects with the data hiding unit 22, and the encoding unit 23 electrically connects with the data hiding unit 22, and the merge unit 24 electrically connects with the data hiding unit 22 and the encoding unit 23.

A QR code serves as the two dimensional barcode in the following is description, but the present invention is not limited to this. Firstly, the acquisition unit 21 acquires a first QR code, which includes an original message data. The acquisition unit 21 extracts a plurality of data modules from the first QR code (the data modules include bits of original message data and are called, for facilitating the illustration, the first data modules).

Next, the acquisition unit 21 sends the plurality of first data modules to the data hiding unit 22. The data hiding unit 22 receives the hidden data and processes the plurality of first data modules, which carry the original message data, based on the hidden data to generate a plurality of data modules (called the second data modules for facilitating the illustration) including the hidden data, and the second data modules are sent to the encoding unit 23 and the merge unit 24.

Next, the encoding unit 23 performs an error correction code encoding on the plurality of second data modules, e.g. an RS encoding, to adjust the second data modules and to generate a plurality of error correction code modules. The plurality of error correction code modules are sent to the merge unit 24. Next, the merge unit 24 merges the plurality of error correction code modules generated by the encoding unit 23 and adjusted second data modules to generate a new QR code (called the second QR code for facilitating the illustration).

Because the plurality of error correction code modules of the second QR code is generated based on the plurality of second data modules including the hidden data, the second QR code has the same error correction capability as the first QR code does. In addition, the hidden data and the message data can be acquired by interpreting the second QR code through a scan device and a particular software algorithm, wherein the message data from the second QR code is substantially the same as the original message data of the first QR code.

Figure 3:
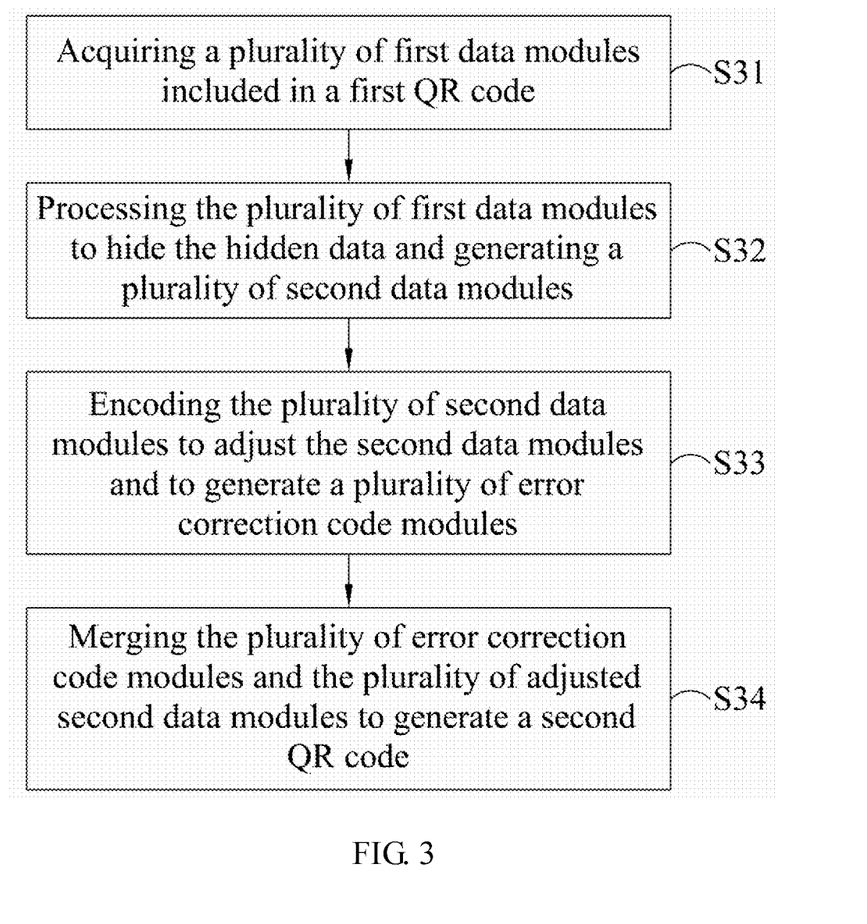
FIG. 3 is a flow chart showing a method of generating a two dimensional barcode including hidden data in an embodiment of the present invention.

Next, the following refers to FIG. 3, which is a flow chart showing a method of generating a two dimensional barcode including hidden data in an embodiment of the present invention. The method of generating the two dimensional barcode including the hidden data can be executed by a computer device, but the present invention is not limited by the executing object.

First, a step S31 includes acquiring a plurality of first data modules included in a first QR code. Next, a step S32 includes processing the plurality of first data modules to hide the hidden data in a plurality of first data modules, and generating a plurality of second data modules based on the processed first data modules. Next, a step S33 includes encoding the plurality of second data modules to adjust the second data modules and to generate a plurality of error correction code modules. Next, a step S34 includes merging the plurality of error correction code modules and the plurality of adjusted second data modules to generate a second QR code.

In addition to being a simple QR code, the generated second QR code, together with a color image, can be processed to generate a more attractive two dimensional barcode including a color image. The following refers to FIG. 4. which is a flow chart showing a method of further generating a two dimensional barcode including a color image based on a two dimensional barcode including hidden data in an embodiment of the present invention. The method in FIG. 4 can be executed by a computer device, but the present invention is not limited by the executing object.

Figure 4:
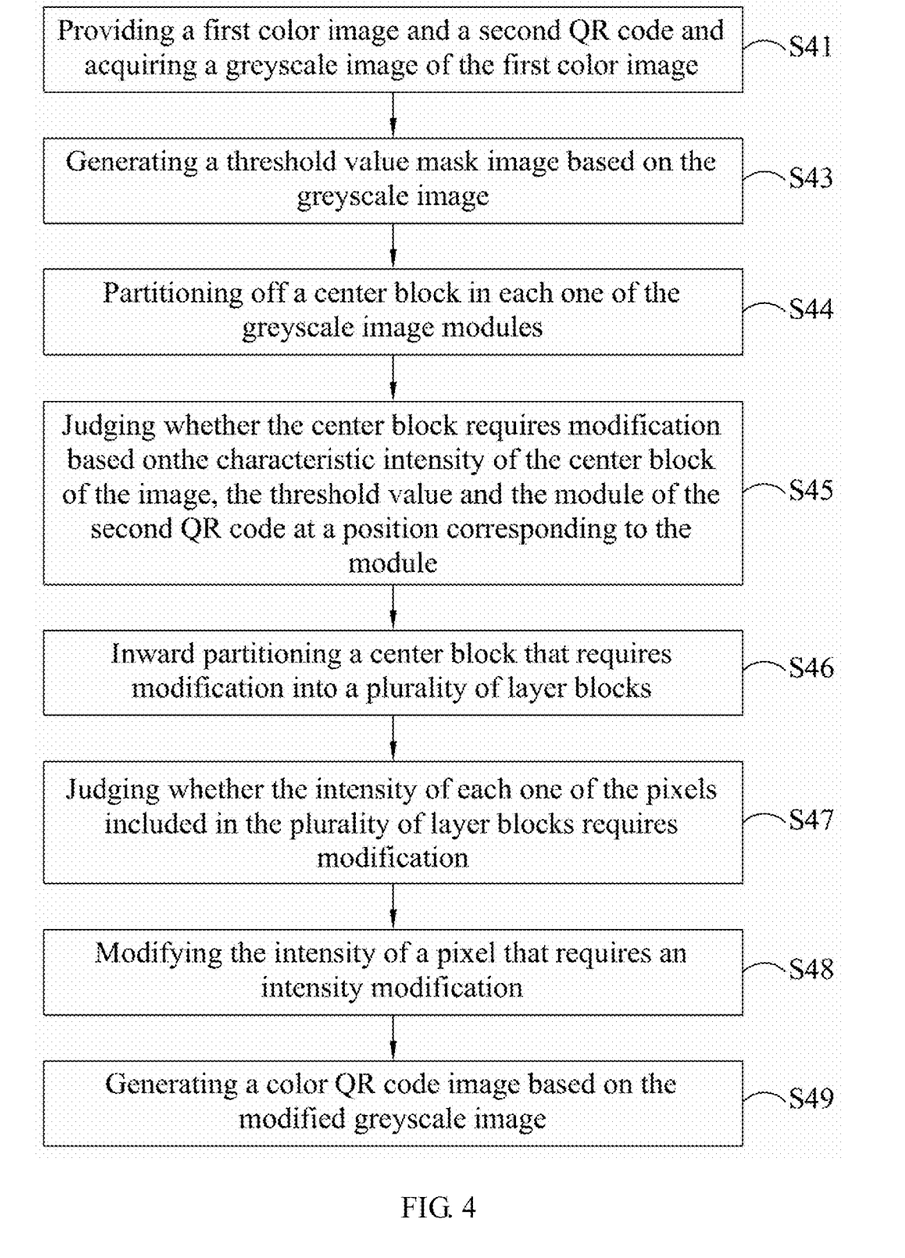
FIG. 4 a flow chart showing a method of further generating a two dimensional barcode including a color image based on a two dimensional barcode including hidden data in an embodiment of the present invention.

First, a step S41 includes providing a color image and a second QR code and, then, acquiring a greyscale image corresponding to the color image. For example, the format of the color image can be converted to YUV to obtain a greyscale image from the Y component, but the invention is not limited to this approach.

Next, a step S43 includes generating a threshold value mask image based on the greyscale image. For example, a method of full range calculation or regional calculation can be used to generate the threshold value mask image. Wherein, the method of regional calculation can help improve the situation of defects that the black and white QR code may have after binarization if the greyscale image has uneven lighting.

Figure 5:
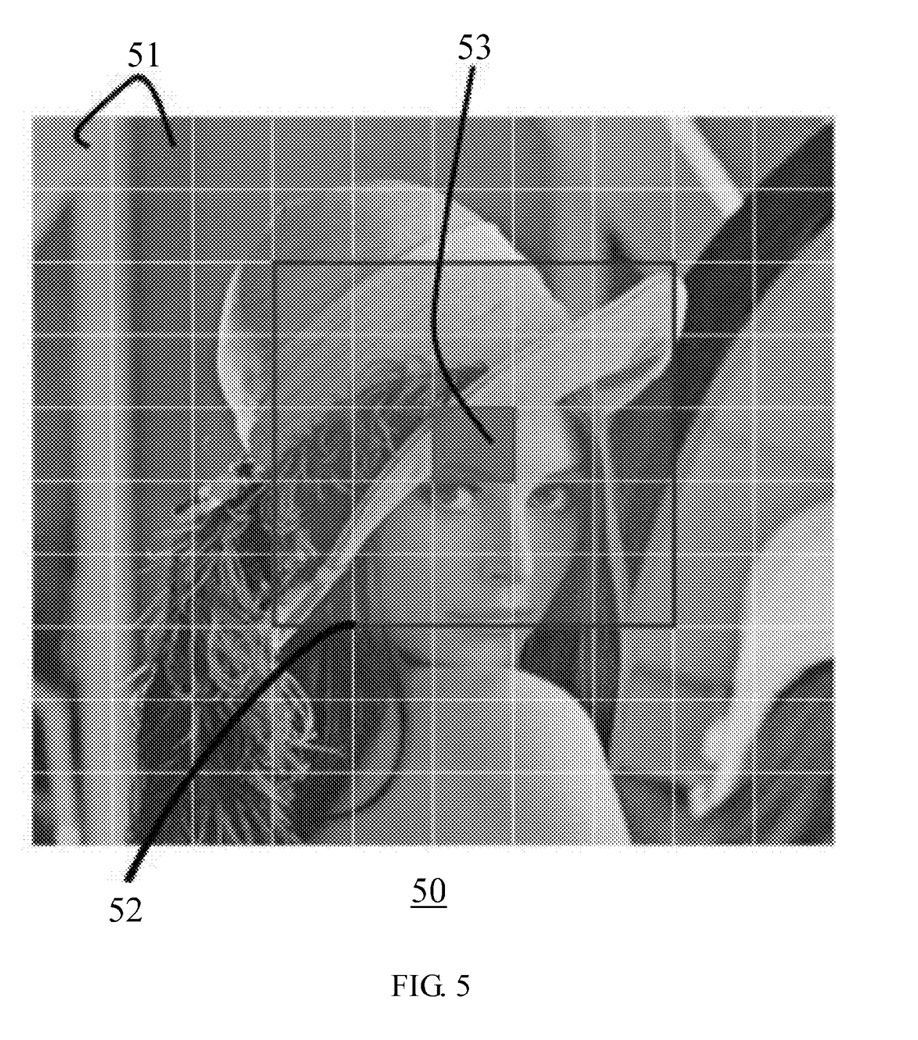
FIG. 5 is a schematic diagram illustrating a regional calculation process in an embodiment of the present invention.
Figure 6:
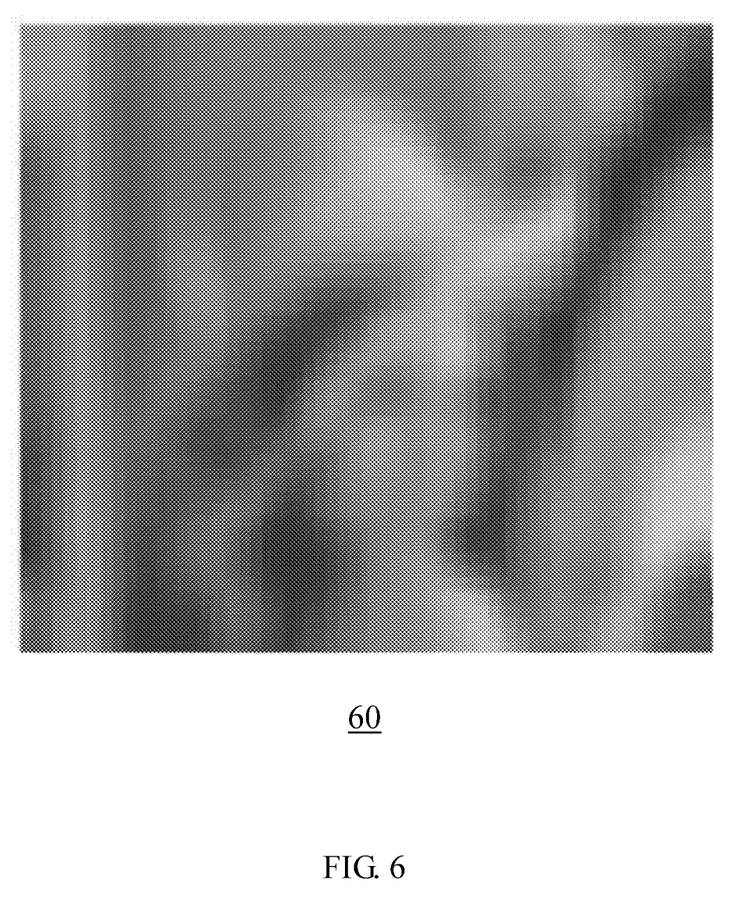
FIG. 6 is a schematic diagram illustrating a threshold value mask image in an embodiment of the present invention.

The following also refers to FIG. 5, which is a schematic diagram illustrating a regional calculation process in an embodiment of the present invention, and FIG. 6, which is a schematic diagram illustrating a threshold value mask image in an embodiment of the present invention. In a greyscale image 50 containing N×N greyscale image pixels 51, the method of regional calculation uses a section window 52 to calculate an average intensity of each one of greyscale image pixels. The section window 52 can have a size containing, for example, 5×5 greyscale image pixels 51, but the present invention is not limited to this size. The average intensity of each one of the greyscale image pixels 51 in the section window 52 will be calculated and acquired and set as the threshold value of the greyscale image 53 in the center of the section window 52. After, the threshold value mask image 60, as the one shown in FIG. 6, is generated after.

Next referring to FIG. 4, a step S44 is proceeded after generating the threshold value mask image in the step S43. The greyscale image and the threshold value mask image are partitioned based on the number of the modules of the second QR code. If the second QR code has M×M modules, the greyscale image and the threshold value mask image will be respectively partitioned into a number of M×M greyscale image modules of equal size and a number of M×M threshold value mask image modules of equal size. Further, a center block is partitioned off in each one of the greyscale image modules in the step S44. For example, if each one of the greyscale image modules has its size of 24 pixels×24 pixels, the center block can have its size of 8 pixel×8 pixels, 10 pixels×10 pixels, or 13 pixels×13 pixels.

Next in a step S45, the characteristic intensity of the center block of the greyscale image module, the threshold value at the corresponding position, and the module of the second QR code at the corresponding position are judged to determine if the center block needs to be modified. If the center block requires no modification, each one of its pixels requires no modification as well. If the center block requires a modification, each one of its pixels is further processed in steps S46-S48.

Further, if the color of the module of the second QR code having its position corresponding to the center block is white ($Qi,j=0$), and the average characteristic intensity (e.g. average intensity or median intensity) of the center block is greater than or equal to the average threshold value of the corresponding position (the average threshold value of the threshold value mask image at the corresponding position) plus a strength value, the center block requires no modification. If the color of the module of the second QR code having its position corresponding to the center block is black ($Qi,j=1$), and the average characteristic intensity of the center block is less than or equal to the average threshold value of the corresponding position (the average threshold value of the threshold value mask image at the corresponding position) minus strength value, the center block requires no modification. For those which do not satisfy the previous conditions, the center block requires a modification.

In other words, if the center block Cij, which is located at a position of row i and column j, satisfies the condition in Function (1), the pixels of the center block Ci,j require no modification. The following is Function (1):

$$Yi,j=Yi,j, \text{ if } \text{``}Yi,j \leq Ti,j-\alpha\text{''} \text{ and } \text{``}Qi,j=1\text{''}, \text{ or } \text{``}Yi,j \geq Ti,j+\alpha\text{''} \text{ and } \text{``}Qi,j=0\text{''} \qquad \text{Function (1)},$$

wherein Yi,j refers to the average characteristic intensity of the center block Ci,j, and Ti,j refers to the average threshold value of the module located at a position of row i and column j in threshold value mask image, and Qi,j refers to the bit value of the module located at a position of row i and column j in the second QR code, and α refers to the strength value, and each one of i and j is an integer selected from 1 to M.

Figure 7:
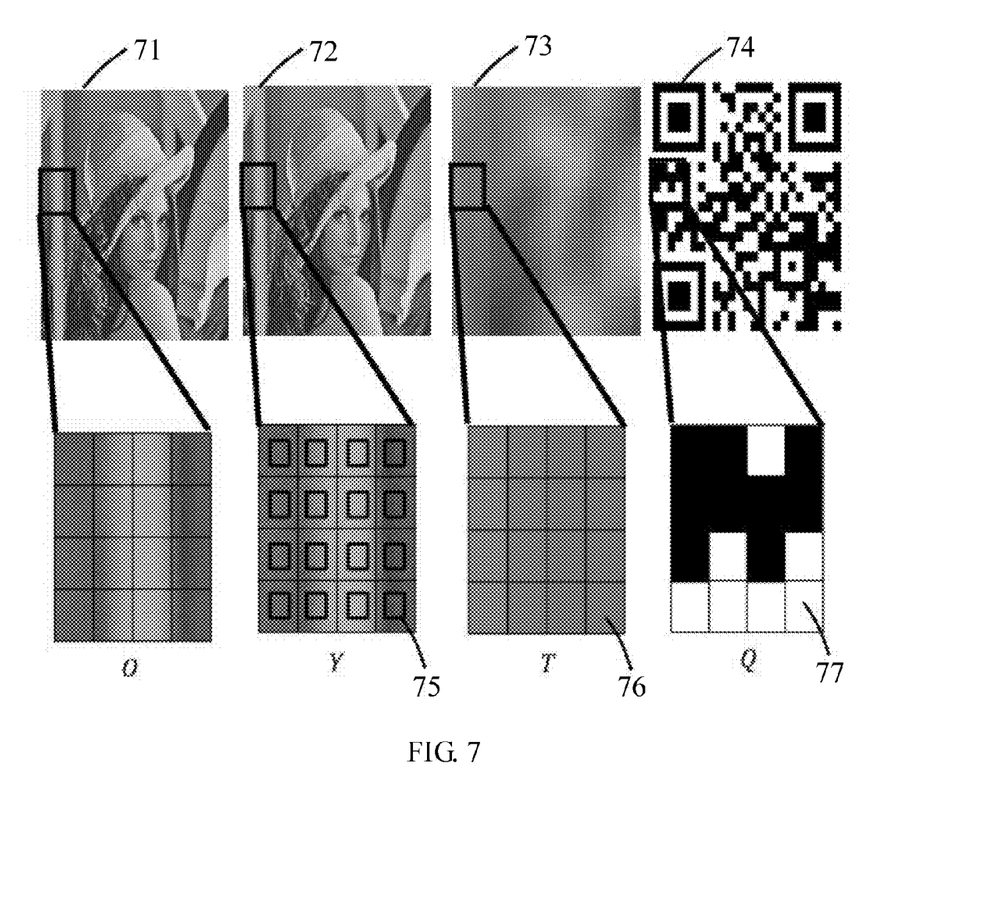
FIG. 7 is a schematic diagram illustrating an approach to decide whether a pixel modification of a center block is required in an embodiment of the present invention.

Furthermore, the following refers to FIG. 7, which is a schematic diagram illustrating an approach to decide whether a pixel modification of a center block is required in an embodiment of the present invention. In FIG. 7, O is an enlarged partial view of a color image 71, and Y is an enlarged view of a greyscale image 72 corresponding to the part of the enlarged view O, and T is an enlarged view of a threshold value mask image 73 corresponding to the part of the enlarged view O, and Q is an enlarged view of a second QR code 74 corresponding to the part of the enlarged view O. The color of a module 77 of the second QR code 74 is white, and, therefore, the center block 75 needs no modification only when the average characteristic intensity of the center block 75 is greater than or equal to the average threshold value of the module 76 of the threshold value mask image 73 plus the strength value.

Figure 8:
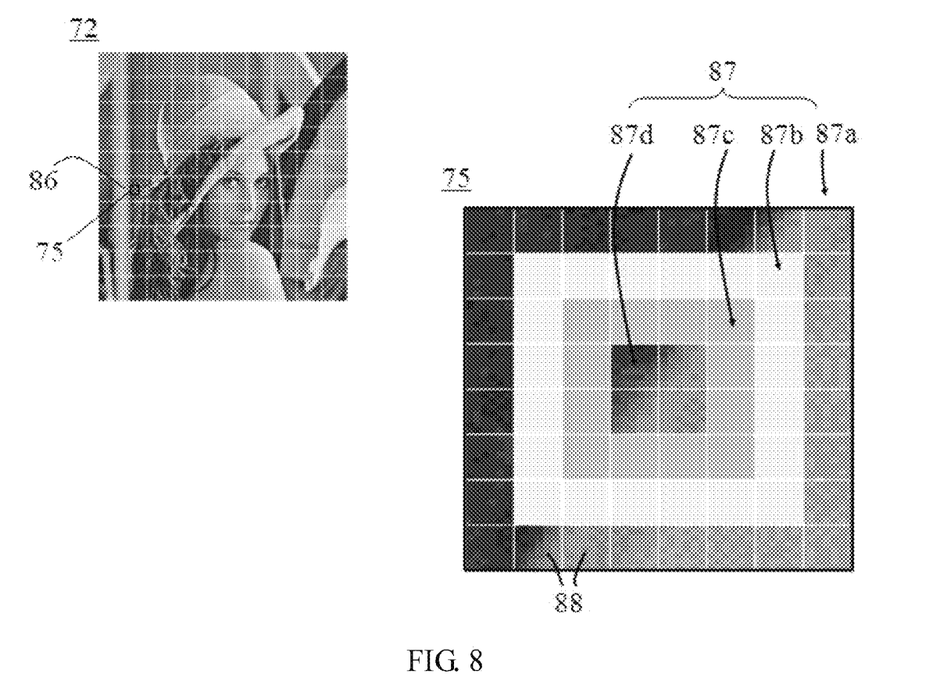
FIG. 8 is a schematic diagram illustrating that a center block is inward partitioned into a plurality of layer blocks in an embodiment of the present invention.

Also referring back to FIG. 4, after the center blocks that require modifications are decided in the step S45, the next step is a step S46. In the step S46, each one of the center blocks that required modifications is partitioned into a plurality of layer blocks. The following refers to FIG. 8, which is a schematic diagram illustrating that a center block is inward partitioned into a plurality of layer blocks in an embodiment of the present invention. If it is decided that the center block 75 of the greyscale image module 86 in the greyscale image 72 requires a modification in the step S45, the center block 75 will be partitioned into a plurality of layer blocks, which include three frame layer blocks including a first frame layer block 87a, a second frame layer block 87b, and a third frame layer block 87c, and a center layer block 87d, wherein a plurality of pixels 88 of the outermost layer constitute the first frame layer block 87a, and so on for other layer blocks.

Also referring back to FIG. 4, next in a step S47, the intensity of a pixel in the plurality of layer blocks, the threshold value at the corresponding position, and the module of the second QR code at the corresponding position are judged to determine whether the pixel in the plurality of layer blocks needs to be modified.

Further, if the color of the module of the second QR code having its position corresponding to the pixel of the plurality of layer blocks is white, and the intensity of the pixel in the plurality of layer blocks is greater than or equal to the threshold value at the corresponding position (the threshold value of the threshold value mask image at the corresponding position) plus the strength value, the intensity of the pixel requires no modification; if the color of the module of the second QR code having its position corresponding to the pixel of the plurality of layer blocks is black, and the intensity of the pixel in the plurality of layer blocks is less than or equal to the threshold value at the corresponding position (the threshold value of the threshold value mask image at the corresponding position) minus the strength value, the intensity of the pixel requires no modification. For those which do not satisfy the previous conditions, the pixels of the plurality of layer blocks require modifications.

In other words, if the pixel of the plurality of layer blocks in the center block Cij, which is located at a position of row i and column j, satisfies the condition of Function (2), the pixel requires no modification. The following is Function (2):

$Yi,j(k)=Yi,j(k)$, if "$Yi,j(k) \leq Ti,j-\alpha$" and "$Qi,j=1$", or
"$Yi,j(k) \geq Ti,j+\alpha$" and "$Qi,j=0$"  Function (2), wherein $Yi,j(k)$ refers to the intensity of the pixel of the layer block k of the plurality of layer blocks in the center block $Ci,j$, and $Ti,j$ refers to the average threshold value of the module located at a position of row i and column j in threshold value mask image, and $Qi,j$ refers to the bit value of the module located at a position of row i and column j in the second QR code, and a refers to the strength value, and each one of i and j is an integer selected from 1 to M.

In a step S48, the intensity is modified for each one of the pixels that requires modifications. The pixel of the plurality of the layer blocks that do not satisfy the condition in Function (2) will be modified based on the its distance from the center pixel of the center block, the strength value, the threshold value of the module at the corresponding position in the threshold value mask image, and the module at the corresponding position in the second QR code. The modification follows Function (3), as shown below:

$Yi,j(k)=Ti,j-wk\alpha$, if "$Yi,j(k)>Ti,j-\alpha$" and "$Qi,j=1$", or $Yi,j(k)=Ti,j+wk\alpha$, if "$Yi,j(k)<Ti,j+\alpha$" and "$Qi,j=0$"  Function (3), wherein the wk is a weight, the value of which is determined based on the distance between the layer block k of the plurality of layer blocks where the pixel locates and the center pixel in the center block.

Also referring back to FIG. 8, the wk values for the pixels in the first frame layer block 87a, the second frame layer block 87b, the third frame layer block 87c, and the center layer block 87d can respectively be 1, 2, 3, and 4, but the present invention is not limited to these values. When a pixel in the first frame layer block 87a requires modification, and the color of the module of the second QR code at the corresponding position is white, the intensity of the pixel will be modified as the following: $Yi,j(1)=Ti,j+w1\alpha$. When a pixel in the center layer block 87d requires a modification, and the color of the module of the second QR code at the corresponding position is black, the intensity of the pixel will be modified as the following: $Yi,j(4)=Ti,j-w4\alpha$.

Figure 9:
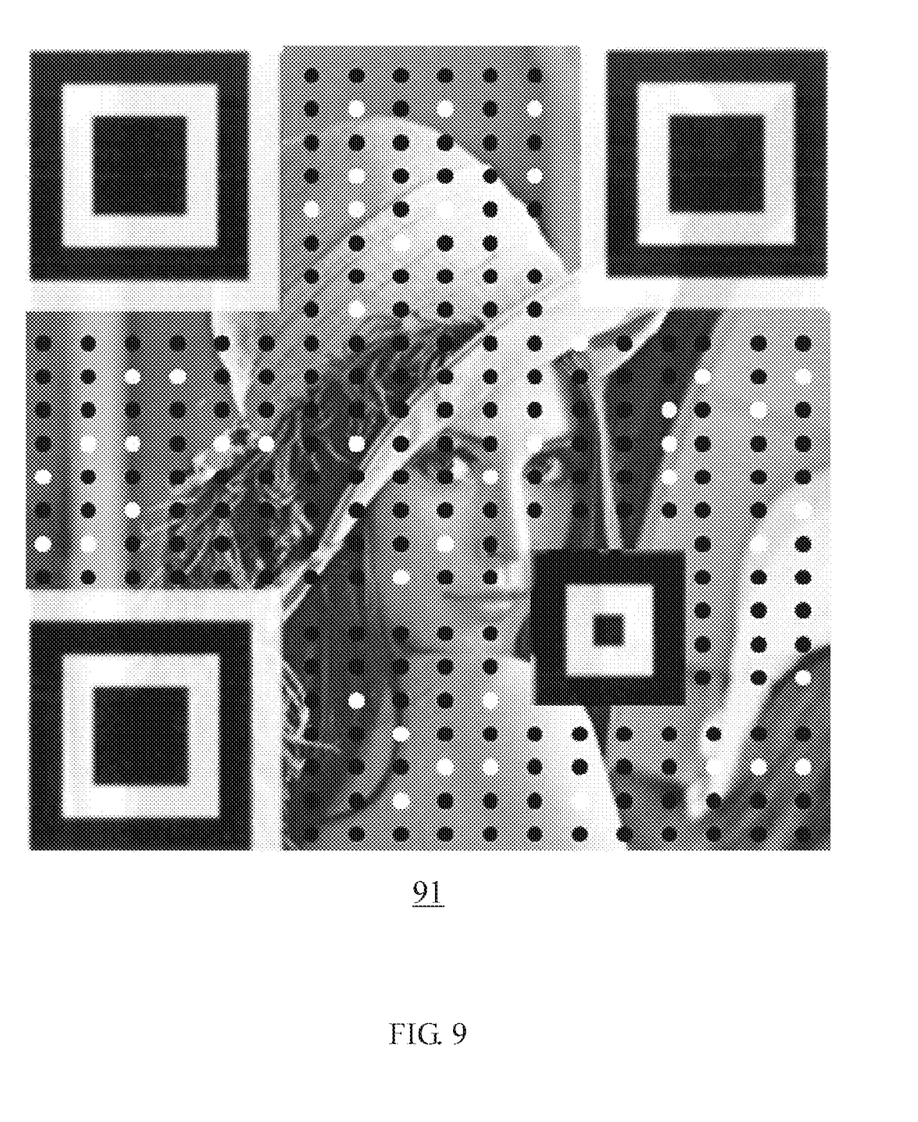
FIG. 9 is a schematic diagram showing a two dimensional barcode including a color image in an embodiment of the present invention.

Next in a step S49, a second QR code including a color image is generated based on the modified greyscale image, which means the modified greyscale image and other UV image are combined to obtain the second QR code including the color image. The following refers to FIG. 9, which is a schematic diagram showing a two dimensional barcode including a color image in an embodiment of the present invention. After finishing the step S49, the generated second QR code including the color image 91 is shown in FIG. 9.

In summary, the method and system for generating a two dimensional barcode including the hidden data use error correction codes to re-encode and hide the hidden data in the original two dimensional barcode and generate a new two dimensional barcode, which has the same error correction capability as the original two dimensional barcode. Moreover, the new two dimensional barcode can be converted to a two dimensional barcode including a color image to make it more attractive.

The present invention is described accompanying with the exemplary embodiments considered practicable at present, but it should be understood that the present invention is not limited to the disclosed embodiments and, on the contrary, intends to cover all modifications and equivalent configurations within the spirit and scope of the appended claims.

What is claimed is:

1. A method for generating a two dimensional barcode including hidden data, comprising steps of:
   acquiring a first two dimensional barcode and extracting a plurality of first data modules from the first two dimensional barcode, wherein the first data modules represent an original message data;
   acquiring the hidden data and processing the first data modules to hide the hidden data in the first data modules and generating a plurality of second data modules based on the processed first data modules;
   performing an error correction code encoding on the second data modules to adjust the second data modules and to generate a plurality of error correction code modules; and
   merging the second data modules and the error correction code modules to generate a second two dimensional barcode;
   providing a color image and acquiring a greyscale image of the color image;
   performing a regional calculation on the greyscale image to obtain a threshold value mask image;
   partitioning the greyscale image into a plurality of modules are included in the greyscale image, wherein the number of the modules of the greyscale image is equal to the number of a plurality of modules of the second two dimensional barcode;
   partitioning off a center block in each one of the greyscale image modules of the greyscale image;
   deciding whether each one of the center blocks requires a modification based on a strength value, the module of the second two dimensional barcode at a corresponding position, a characteristic intensity of the center block, a threshold value of the module of the threshold value mask image at a corresponding position;
   modifying at least one pixel of the center block that requires the modification; and
   generating the two dimensional barcode including the color image based on the modified greyscale image.

2. The method for generating the two dimensional barcode including the hidden data of claim 1, wherein the first two dimensional barcode and the second two dimensional barcode are respectively a first QR code and a second QR code.

3. The method for generating the two dimensional barcode including the hidden data of claim 2, wherein the error correction code encoding is a RS encoding.

4. The method for generating the two dimensional barcode including the hidden data of claim 1, wherein the center block that requires the modification is inward partitioned to acquire a plurality of layer blocks of the center block, wherein the plurality of layer blocks includes at least one frame layer block and one center layer block.

5. The method for generating the two dimensional barcode including the hidden data of claim 4, wherein the strength value, an intensity of the pixel of the plurality of layer blocks, the threshold value of the module of the threshold value mask image at the corresponding position, and the module of the second two dimensional barcode at the corresponding position are judged to decide whether the pixel needs to be modified.

6. The method for generating the two dimensional barcode including the hidden data of claim 5, wherein each one of the pixels that require to be modified is modified based on the intensity of the pixel, a distance between the pixel and a center pixel of the corresponding center block, the strength value, and the threshold value of the module of the threshold value mask image at the corresponding position.

7. A system for generating a two dimensional barcode including hidden data, comprising:
an acquisition unit configured to acquire a first two dimensional barcode and to extract a plurality of first data modules are included in the first two dimensional barcode, wherein the first data modules represent an original message data;
a data hiding unit configured to acquire the hidden data and to process the first data modules to hide the hidden data in the first data module and to generate a plurality of second data modules based on the processed first data modules;
an encoding unit configured to perform an error correction code encoding on the plurality of second data modules to adjust the second data modules and to generate a plurality of error correction code modules;
a merge unit configured to merge the second data modules and the error correction code modules to generate a second two dimensional barcode;
a computer device configured to execute steps of:
providing a color image and acquiring a greyscale image of the color image;
performing a regional calculation on the greyscale image to obtain a threshold value mask image;
partitioning the greyscale image into a plurality of modules are included in the greyscale image, wherein the number of the modules of the greyscale image is equal to the number of a plurality of modules of the second two dimensional barcode;
partitioning off a center block in each one of the greyscale image modules of the greyscale image;
deciding whether each one of the center blocks requires a modification based on a strength value, the module of the second two dimensional barcode at a corresponding position, a characteristic intensity of the center block, a threshold value of the module of the threshold value mask image at a corresponding position;
modifying at least one pixel of the center block that requires the modification; and
generating the two dimensional barcode including the color image based on the modified greyscale image.

8. The system for generating a two dimensional barcode including the hidden data of claim 7, wherein the first two dimensional barcode and the second two dimensional barcode are respectively a first QR code and a second QR code.

9. The system for generating a two dimensional barcode including the hidden data of claim 8, wherein the error correction code encoding is a RS encoding.

* * * * *